United States Patent [19]
Choi

[11] Patent Number: 6,165,244
[45] Date of Patent: Dec. 26, 2000

[54] FILTER MEDIA WITH FLUID STREAM POSITIONED FIBERS

[75] Inventor: Kyung-Ju Choi, Jefferson County, Ky.

[73] Assignee: AAF International, Inc., Louisville, Ky.

[21] Appl. No.: 09/266,402

[22] Filed: Mar. 13, 1999

[51] Int. Cl.⁷ .................................................. B01D 39/16
[52] U.S. Cl. .......................... 55/527; 55/528; 55/487; 55/DIG. 43; 55/DIG. 45
[58] Field of Search ................ 55/484, 485, 486, 55/527, DIG. 5, DIG. 43, DIG. 44, DIG. 45, 487, 528; 210/490, 491, 499, 500.1; 442/181, 239, 327

[56] References Cited

U.S. PATENT DOCUMENTS

| | | |
|---|---|---|
| 3,877,909 | 4/1975 | Hansen ........................................ 55/527 |
| 3,920,428 | 11/1975 | Kinsley, Jr. ................................ 55/528 |
| 4,181,513 | 1/1980 | Fukuda et al. ............................. 55/527 |
| 4,360,433 | 11/1982 | Walker et al. . |
| 4,390,031 | 6/1983 | Berger . |
| 4,593,706 | 6/1986 | Preston et al. . |
| 4,915,835 | 4/1990 | Bazuza et al. . |
| 5,470,470 | 11/1995 | Leyat . |
| 5,605,748 | 2/1997 | Kennedy et al. ........................... 55/527 |
| 5,657,750 | 8/1997 | Colman et al. . |
| 5,667,544 | 9/1997 | Haas et al. ................................. 55/527 |
| 5,695,487 | 12/1997 | Cohen et al. . |
| 5,785,725 | 7/1998 | Cusick et al. .............................. 55/527 |

*Primary Examiner*—David A. Simmons
*Assistant Examiner*—Minh-Chau T. Pham
*Attorney, Agent, or Firm*—Polster, Lieder, Woodruff & Lucchesi

[57] ABSTRACT

A filter including a fibrous filter medium mat, having an upstream dirty fluid inlet and a downstream clean fluid outlet, with a majority of the filter medium fibers oriented in a substantially unrestrained, aligned direction so as to be aligned with the direction of fluid stream flow, the fibrous filter medium mat combinable in a preselected manner with filter media of randomly dispersed fibers.

17 Claims, 4 Drawing Sheets

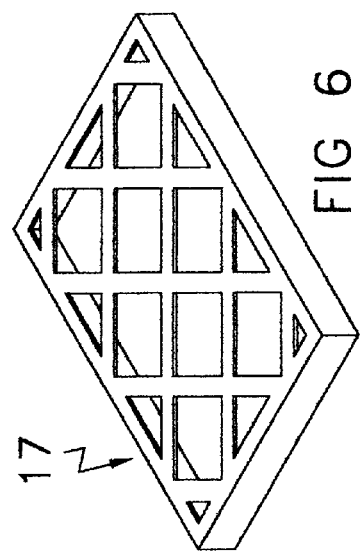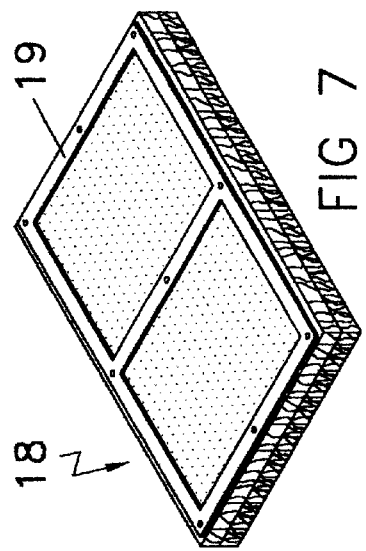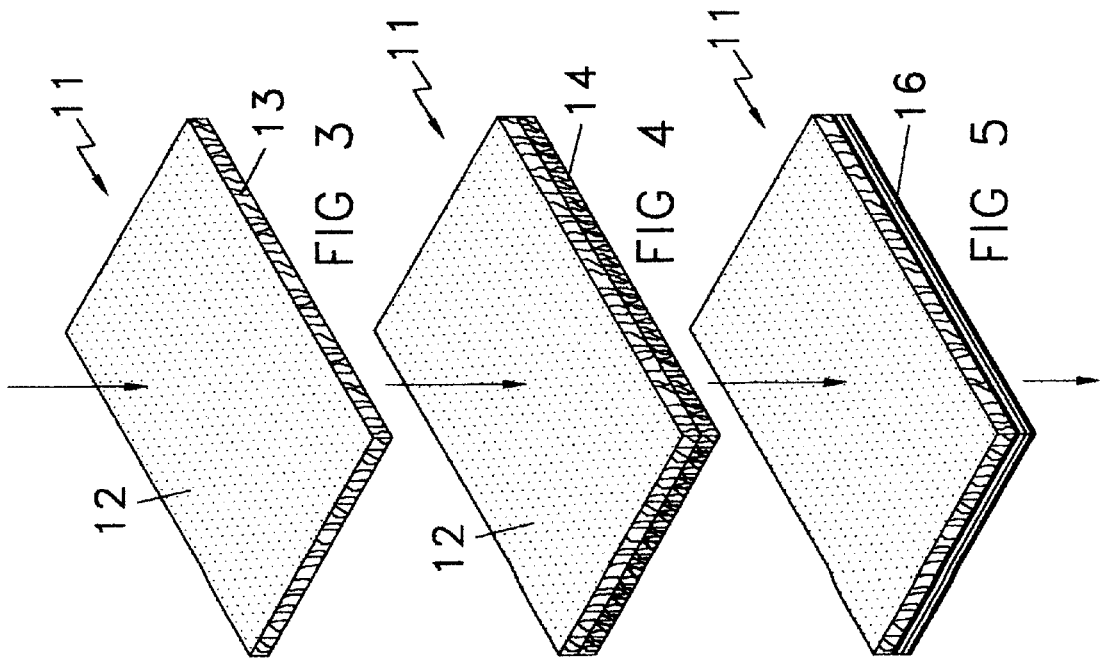

FILTER MEDIA WITH FLUID STREAM POSITIONED FIBERS

BACKGROUND OF THE INVENTION

The present invention relates to filter structure and more particularly to filter medium construction wherein the fibers of the filter medium are preselectively oriented in a unique fashion with respect to the fluid stream to be passed therethrough.

It is generally known to preselectively orient the fibers of a filter medium, attention being directed to U.S. Pat. No. 4,360,433, issued to B. Walker et. al. on Nov. 23, 1982, wherein a majority of compacted fibers of a tubular wall of filter medium are supported by a surrounding apertured sheet with the fibers being approximately parallel to one another in a circumferential direction about the central axis of the tubular wall. In U.S. Pat. No. 4,390,031, issued to R. M. Berger on Jun. 28, 1983, fibers of a tubular cigarette filter are oriented in an adjacent and overlapping relation to extend transverse the longitudinal axis of the tubular filter. In U.S. Pat. No. 4,593,706, issued to E. G. Preston et. al. on Jun. 10, 1986, also for tubular cigarette filters, broken fibers of irregular length are rolled and formed into filter rods. In U.S. Pat. No. 4,915,835, issued to Y. Barzuza on Apr. 10, 1990, adjacent fibers of liquid filter mediums are disposed in dual relationship with the line of the liquid flow to be treated—a portion of the fibers being substantially parallel to the line of liquid flow and a portion of the fibers being transverse the line of liquid flow. In U.S. Pat. No. 5,470,470, issued to J. C. Leyat on Nov. 28, 1995, a liquid filter of a compacted mass of substantially parallel elongate fibers are oriented axially in a cylindrical casing to extend in substantially parallel relation transverse to the line of flow of liquid to be treated. In U.S. Pat. No. 5,657,750, issued to L. Colman et. al. on Aug. 19, 1997, hollow fiber filter elements are utilized to separate gas passed transversely therethrough from a liquid/gas fluid. Further, in U.S. Pat. No. 5,695,487 issued to B. Cohen et. al. on Dec. 9, 1997, a pleated fibrous web of longitudinally extending fibers is utilized as a liquid absorbent material and fibrous materials with parallel and adjacent fibers have been commercially available from various U.S. distributors such as Fibercraft, Inc. of Tupelo, Miss., which company has been selling such materials for absorbents, mattress padding and furniture cushioning.

The present invention recognizing the availability of such fibrous materials, utilizes the same in a new and useful manner for gas treating filters which are straightforward and economical in both manufacture and assembly, and, which provide a unique filter and fibrous medium arrangement having an increased filtration efficiency and a reduced resistance to the gaseous streams to be treated. Furthermore, the fibrous filter medium arrangement of the present invention lends itself readily to various geometric configurations and to combinations with other filter mediums.

Various other features of the present invention will become obvious to one skilled in the art upon reading the disclosure set forth herein.

BRIEF DESCRIPTION OF THE INVENTION

More particularly, the present invention provides a fluid filter for filtering particulate matter from a fluid stream comprising: at least one fibrous filter medium mat having an upstream dirty fluid inlet face and a spaced downstream clean fluid outlet face, the majority of the fibers of the filter medium mat being fluid stream aligned to extend in a substantially free and loose non-compressed direction from the dirty fluid inlet face to the clean fluid outlet face substantially parallel and aligned with a direct line of fluid stream flow from the dirty fluid inlet face to the clean fluid outlet face of the fibrous filter medium mat.

It is to be understood that various changes can be made by one skilled in the art in one or more of the several parts of the apparatus disclosed herein without departing from the scope or spirit of the invention.

BRIEF DESCRIPTION OF THE DRAWINGS

Referring to the drawings which disclose several embodiments of the present invention:

FIG. 3 is an isometric view of a portion of a thinner fibrous filter medium mat also incorporating in schematic form the unique fiber alignment of a majority of the fibers of the inventive filter medium;

FIG. 4 is an isometric view of portions of combined fibrous filter mats with the upstream mat being like the unique mat of FIG. 3 and the downstream mat being a fibrous filter mat with a majority of the fibers being similarly aligned in schematic form but of greater density, aligned with respect to the line of fluid stream flow;

FIG. 5 is an isometric view of portions of combined fibrous filter mats like those of FIG. 4, with the majority of the fibers of the downstream mat extending conventionally transverse to the line of treated fluid flow;

FIGS. 6 and 7 are isometric views of typical flow-through filter frames which can be appropriately sized to incorporate fibrous filter mat arrangements as disclosed in FIGS. 1–5;

DETAILED DESCRIPTION OF THE INVENTION

Figure 1:
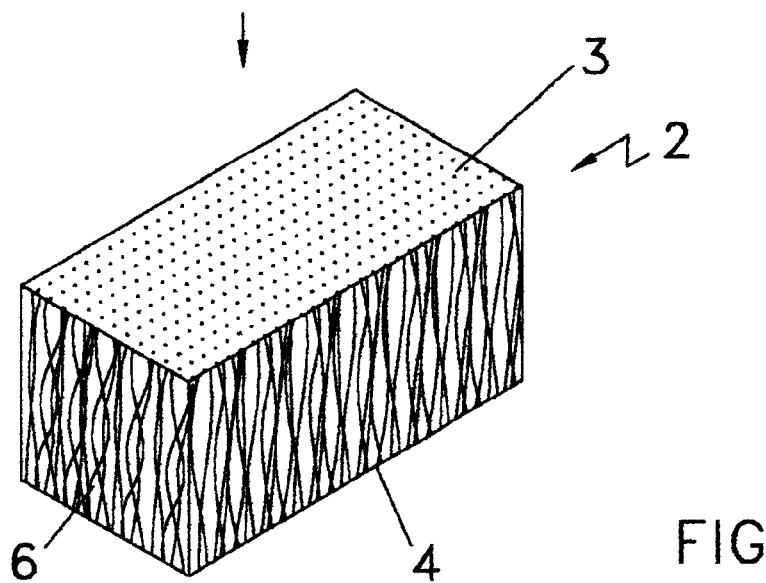
FIG. 1 is a perspective view of a comparatively thick portion of a fibrous filter medium mat incorporating in schematic form the unique fiber alignment of a majority of the fibers of the inventive filter medium.

Referring to FIG. 1 of the drawings, a thick portion of fibrous filter medium 2 is disclosed incorporating the novel fiber alignment of the present invention wherein it can be seen that the flat filter medium 2 includes an upstream dirty fluid inlet face 3 and a spaced downstream clean fluid outlet face 4. As can be seen in this Figure, the majority of the fibers 6 of the fibrous filter medium 2 are fluid stream substantially aligned and entwisted as indicated by the flow arrows to extend in substantially unrestrained, loose, lineal and substantially oriented in direct flow manner from dirty inlet face 3 to clean fluid outlet face 4 so as to be substantially parallel to and aligned with the direct flow line of the fluid stream flow—as indicated by the flow arrows—from the dirty inlet face 3 to the clean fluid outlet face 4. The fibrous filter mat disclosed, which is particularly adapted for gas filtration and more specifically, dirty air filtration, is comprised of approximately thirty (30) to ninety-five (95) percent by number of fibers extending in a substantially oriented, lineal direction parallel to the line of fluid flow from dirty inlet face to clean fluid outlet face 4 of fibrous filter mat. Advantageously, the fibrous filter mat 2 comprises approximately sixty-two (62) percent by number of such substantially aligned, entwisted, parallel to flow fibers. Although any number of fibrous materials can be utilized to incorporate the novel fiber arrangement as herein disclosed, advantageously fibrous materials of dimensionally planned, spun or chopped glass fibers or synthetic, or natural fiber materials can be employed and, in fact, a fibrous material of a preselected mixture by weight and number of glass and synthetic fiber material can be employed.

Figure 2:
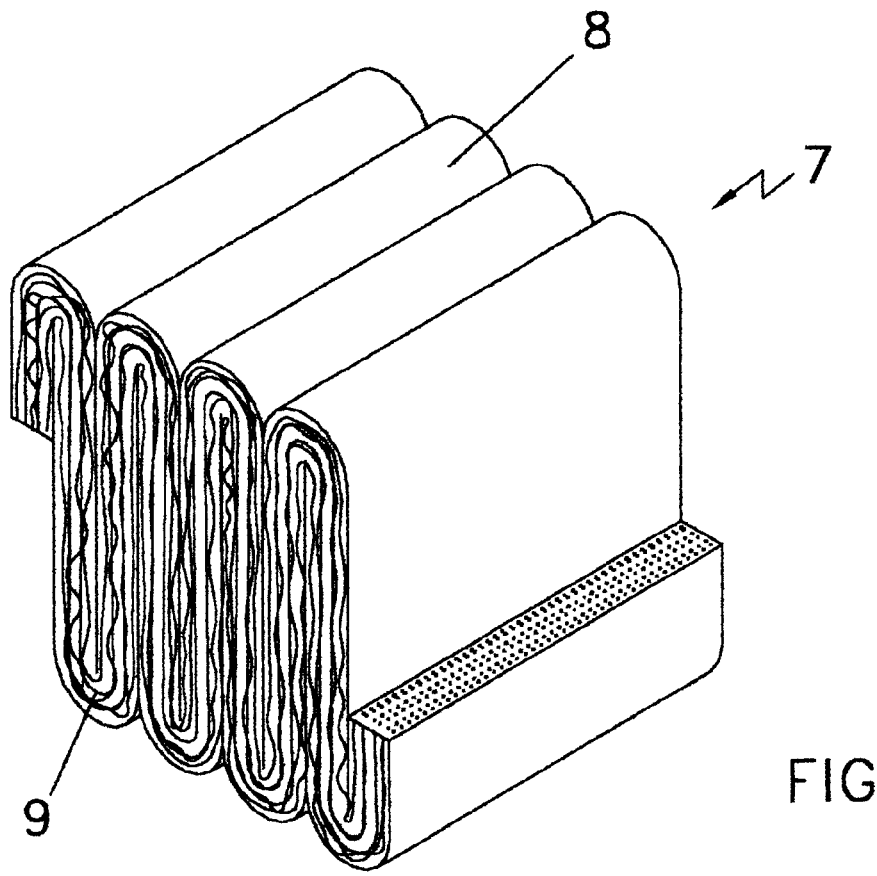
FIG. 2 is an isometric view of a portion of another conventional thinner fibrous filter medium mat with transverse fiber alignment, incorporating the inventive fiber oriented flow alignment in schematic form by folding the media in face-to-face parallel flow oriented form.

In FIGS. 2–5, thinner fibrous filter mats incorporating the novel features of the present invention are disclosed. In FIG. 2, a conventional mat 7 with fibers substantially transverse to the line of flow is shown folded upon itself as a face-to-face type filter medium with a majority of the fibers being oriented along the direct, parallel line of fluid flow from upstream face 8 to downstream face 9 in the same manner as the majority of the fibers of the fibrous mat 2 of FIG. 1. Likewise, in FIGS. 3–5, a thinner fibrous filter mat 11 is disclosed with a majority of the fibers being oriented substantially along the direct, parallel line of fluid flow from upstream face 12 to downstream face 13 in the same manner as the majority of the fibers of the fibrous filter mats 2 and 7 of FIGS. 1 and 2. In FIG. 3, filter mat 11, with upstream face 12 and downstream face 13, is disclosed as a single mat of preselected thickness, length and width, being sized in accordance with its expected commercial use. In FIG. 4, filter mat 11 is shown in face-to-face relation with a second filter mat 14 which has a substantial majority of its fibers oriented along fluid flow direction as mat 11 but being of a greater density. In FIG. 5, filter mat 11 is shown in face-to-face relation with filter mat 16. It is to be noted that in this FIG. 5, the fibers of mat 16 extend conventionally transverse to the line of fluid flow unlike mat 11 where the substantial majority of fibers are in substantially parallel orientation with the direction of fluid flow. It further is to be understood that in both FIGS. 4 and 5, the order of alignment of the fibrous filter mats can be reversed in accordance with filtering demands.

Although any one of a number of filter frames can be utilized with the fibrous filter mats described, FIG. 6 discloses a stable, flow-through frame 17 which can be sized in accordance with the fibrous mat to be enclosed and supported thereby. FIG. 7 discloses still another stable frame 18 which is comprised of opposed mating flow-through frame members 19 (only one of which can be seen) and interlockingly joined in a manner as set forth in U.S. patent application Ser. No. 09/236,207, filed by Kyung-Ju Choi on Jan. 23, 1999.

Figure 10:
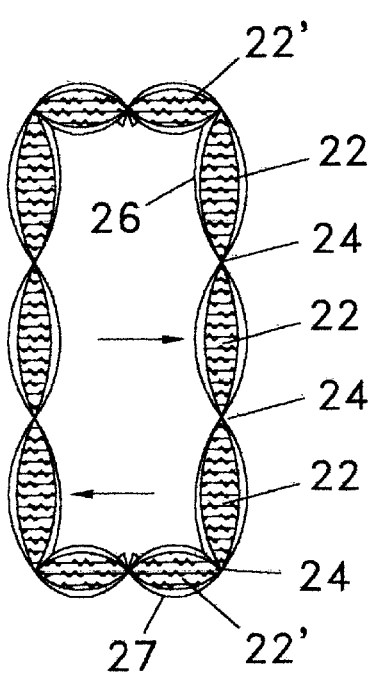
FIG. 10 is a cross-sectional view of the pocket filter of FIGS. 8 and 9 taken in a plane through lines 10—10 of FIG. 8.
Figure 8:
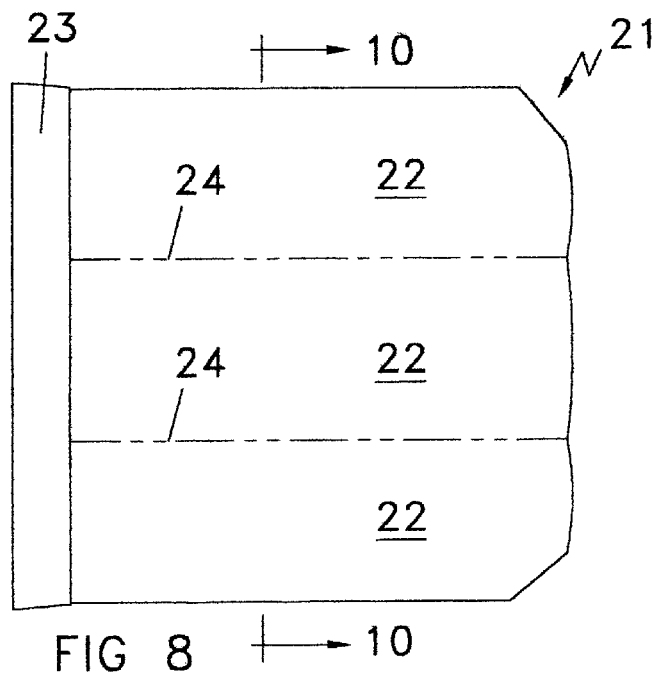
FIG. 8 is a schematic plan view of a typical pocket type filter assembly, which can incorporate the fibrous filter mat features of the present invention.
Figure 9:
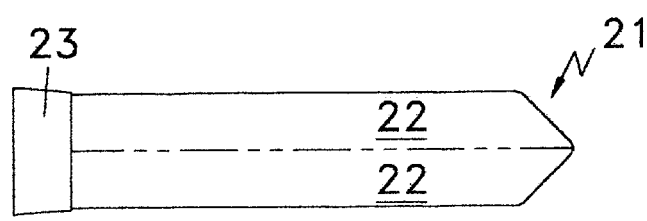
FIG. 9 is a side view of the pocket type filter of FIG. 8.
Figure 11:
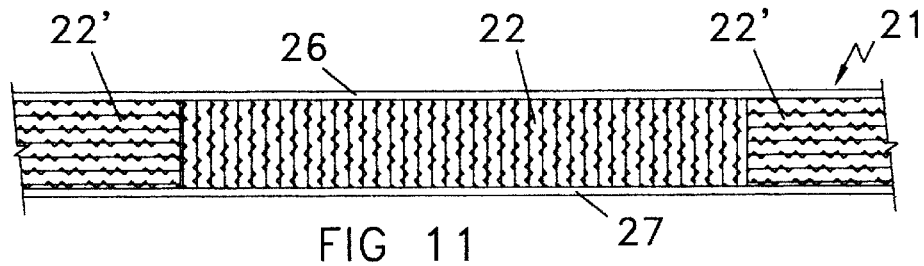
FIG. 11 is an enlarged cross-sectional view of a portion of a pocket type filter assembly similar to that of FIGS. 8–10, incorporating several types of fibrous filter mats including a mat type of the present invention.
Figure 12:
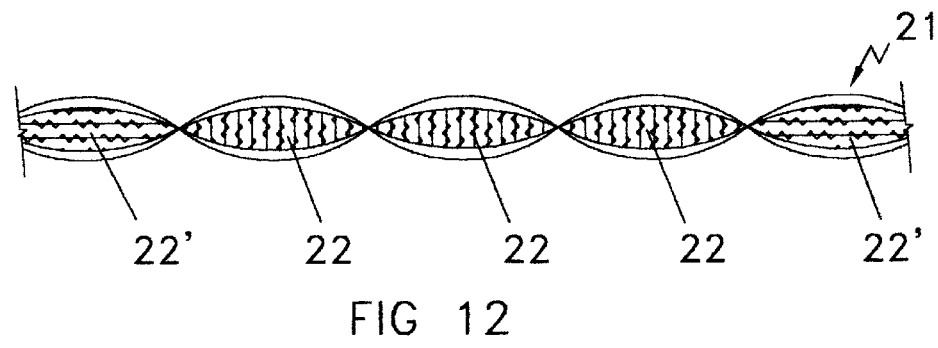
FIG. 12 is an enlarged cross-sectional view of the portion of the pocket type filter mat assembly of FIG. 11 with the mat assembly gathered at spaced intervals and joined to provide columnar pocket spaced filter sides; and, FIG. 13 is a graph disclosing comparative efficiencies of two types of filter mediums tested under similar conditions with fibers disposed transverse the flow direction of the treated fluid stream flow in a conventional type fluid filter medium and with fibers aligned with the flow direction of the treated fluid stream flow in the other type of fluid filter medium constructed in accordance with the present invention.

Referring to FIGS. 8–12, a typical open mouth pocket type filter 21, with columns 22 and a support header 23 is disclosed in FIGS. 8–10 incorporating the novel fiber arrangement described herein with the columns 22 being formed with fibrous filter mat gathering such as by stitching, adhesively binding or fusion binding, as at 24. Referring to the enlargement of FIGS. 11 and 12, it can be seen that two types of fibrous filter mats incorporating the novel features of the present invention are combined to form columns 22 of pocket type filter 21, with the three opposed side columns 22 of pocket 21 being formed with the majority of the fibers being oriented parallel with the direction of fluid flow-through the pocket columns and the opposed end columns 22' being formed with the majority of the fibers being transversely oriented to the direction of fluid flow through the pocket columns. Further, it is to be noted that the upstream and downstream columns of the pocket can be provided with opposed thin outer supporting layers of fibrous media. Advantageously, the upstream supporting layer 26 can be of a conventional fiberglass flow-through filter media and the downstream supporting layer 27 can be of a conventional synthetic, or fiberglass filter media. It is to be understood that the types, thickness and densities of these support layers can be varied in accordance with filtration demands.

Figure 13:
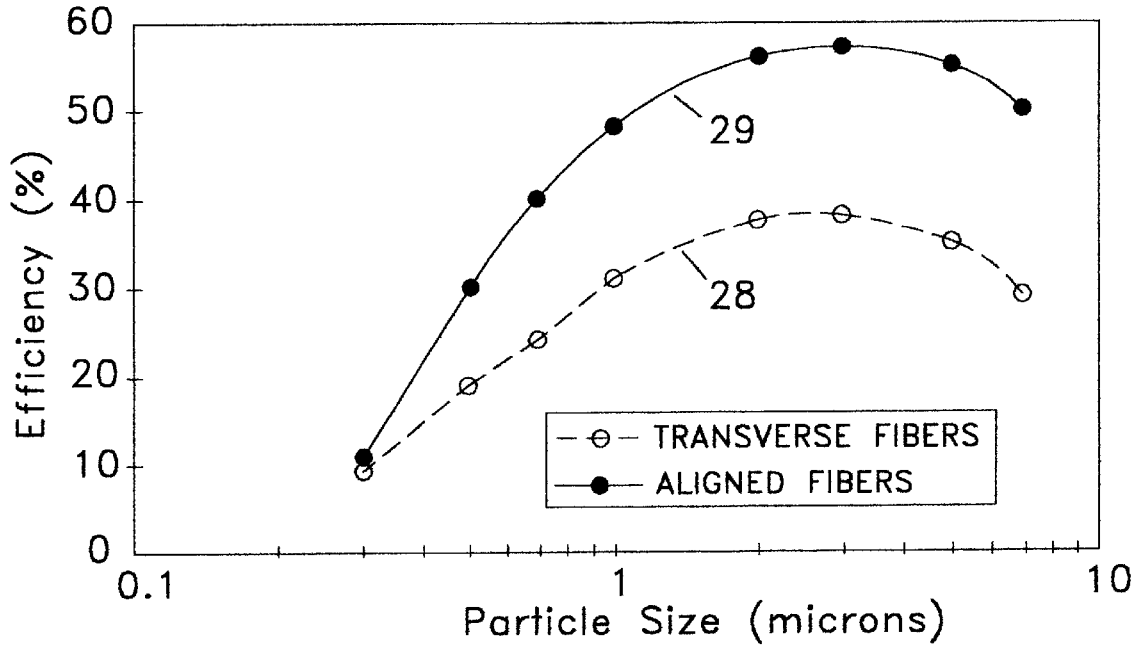

Referring to FIG. 13 of the drawings which discloses comparative efficiency curves of two tested filter media, one filter medium 28, represented by open circles, being of a conventional type with the fibers extending transverse the flow direction of a treated fluid stream and the other filter medium being constructed in accordance with the present invention with the fibers substantially aligned and entwisted with the flow direction of a like treated fluid stream. With the compared filter mediums being of like geometry, the same basis weight of zero point four (0.4) ounces per square foot and the like tested fluid streams having the same velocity of five hundred (500) feet per minute, it was learned that the inventive aligned fiber filter medium 29 had both a higher filtration efficiency, as illustrated in FIG. 13, with a lower pressure drop of zero point three nine (0.39) inches of water as compared to the higher pressure drop of zero point four five (0.45) inches of water of the transverse fibers filter medium 28, represented by filled circles, when so tested under equal conditions.

The invention claimed is:

1. A fluid filter for filtering particulate matter from a fluid stream comprising: at least one fibrous filter medium mat having an upstream dirty fluid inlet face and a spaced downstream clean fluid outlet face, the majority of the fibers of said filter medium mat being substantially oriented along the line of fluid stream flow to extend in a free and loose, lineal direction from said dirty fluid inlet face to said clean fluid outlet face substantially oriented parallel to the direction of the flow of the fluid stream when passing from said dirty fluid inlet face to said clean fluid outlet face of said filter mat.

2. The filter of claim 1, wherein said fibrous filter mat is particularly adapted for gas filtration and is comprised of approximately thirty (30) to ninety-five (95) percent by number of said fluid stream fibers extending in a substantially oriented and entwisted direction parallel to the line of fluid flow from said dirty fluid inlet face to said clean outlet face of said filter mat.

3. The filter of claim 1, wherein said fibrous filter mat advantageously comprises approximately sixty-two (62) percent by number of said fluid stream aligned fibers extending in a substantially oriented direction parallel to the line of fluid flow from said dirty fluid inlet face to said clean outlet face of said filter mat.

4. The filter of claim 1, wherein said fibrous filter mat is of glass fiber material.

5. The filter of claim 1, wherein said fibrous filter mat is of synthetic fiber material.

6. The filter of claim 1, wherein said fibrous filter mat is of natural fiber material.

7. The filter of claim 1, wherein said fibrous filter mat is of a mixture by weight of glass and synthetic fiber material.

8. The filter of claim 1, wherein said filter further comprises at least a second fibrous filter medium mat in fluid flow alignment with said other mat with substantially a majority of the fibers thereof being similarly oriented with respect to the line of fluid stream flow but of different density.

9. The filter of claim 8, wherein said second fibrous filter mat is positioned upstream said mat having a majority of fluid stream oriented fibers.

10. The filter of claim 8, wherein said second mat is positioned downstream said mat having a majority of fluid stream oriented fibers.

11. The filter of claim 1, wherein said filter further comprises at least a second fibrous filter mat in fluid flow alignment with said other mat with a majority of the fibers extending transversely oriented to the line of fluid flow.

12. The filter of claim 1, wherein said fibrous filter medium mat is of conventionally oriented transverse fibers which when folded in face-to-face relation, has the majority of such fibers oriented to extend along the line of fluid stream flow.

13. The filter of claim 1, wherein said fibrous filter medium mat is gathered at spaced intervals and joined to provide columnar pockets presenting upstream and downstream faces to a fluid stream to be treated.

14. The filter of claim 13, wherein said columnar tabular filter pocket includes columns wherein substantially the majority of the fibers of such columns are oriented in alignment with respect to the line of fluid stream flow.

15. The filter of claim 13, wherein said fibrous filter medium mat is provided on at least one face thereof with a thin facing layer of fibrous media.

16. The filter of claim 15, wherein said fibrous filter medium mat is provided on opposite faces thereof with thin facing layers of fibrous media.

17. The filter of claim 16, wherein one facing layer of fibrous media is of fiberglass material and the other layer is of synthetic material.

\* \* \* \* \*